US008272468B2

(12) United States Patent
Iida

(10) Patent No.: US 8,272,468 B2
(45) Date of Patent: Sep. 25, 2012

(54) WORK MACHINE

(75) Inventor: Keisuke Iida, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 241 days.

(21) Appl. No.: 12/712,887

(22) Filed: Feb. 25, 2010

(65) Prior Publication Data

US 2011/0203399 A1 Aug. 25, 2011

(51) Int. Cl.
*B60K 26/00* (2006.01)

(52) U.S. Cl. ......... 180/333; 180/324; 180/331; 180/332

(58) Field of Classification Search .................. 180/315, 180/326, 329, 330, 331, 333, 324, 332
See application file for complete search history.

(56) References Cited

U.S. PATENT DOCUMENTS

| | | | | |
|---|---|---|---|---|
| H1822 H | | 12/1999 | Kelley et al. | |
| 6,435,289 B1 * | | 8/2002 | Hori et al. | 180/6.3 |
| 7,334,658 B2 * | | 2/2008 | Berg et al. | 180/333 |
| 7,497,298 B2 * | | 3/2009 | Shearer et al. | 180/333 |
| 7,681,686 B1 * | | 3/2010 | Klas et al. | 180/331 |
| 7,740,101 B2 * | | 6/2010 | Yanaka | 180/315 |
| 7,775,321 B2 * | | 8/2010 | Hirukawa | 181/227 |
| 2003/0037985 A1 | | 2/2003 | Jeppe et al. | |
| 2005/0034549 A1 | | 2/2005 | Braud | |

FOREIGN PATENT DOCUMENTS

| | | |
|---|---|---|
| EP | 1 136 628 A1 | 9/2001 |
| EP | 1 236 834 A1 | 9/2002 |
| EP | 1 486 848 A1 | 12/2004 |

* cited by examiner

*Primary Examiner* — Toan To

(74) *Attorney, Agent, or Firm* — Birch, Stewart, Kolasch & Birch, LLP

(57) ABSTRACT

A tractor includes a boom and a bucket being coupled with each other in series and having the same rotating direction, and a control lever for operating both the boom and the bucket. The control button is equipped in the control lever, and the control lever can operate either a boom or a bucket after either the boom or the bucket is selected by pressing the control button.

5 Claims, 7 Drawing Sheets

WORK MACHINE

BACKGROUND OF THE INVENTION

1. Field of the Invention

The present invention relates to a work machine, such as an agricultural machine and a construction machine, having booms and a bucket, linked to each other in a row with the same rotating direction, and having a control lever operating the booms and the bucket by tilting a part of itself.

2. Description of the Related Art

Tractors having a front loader (a work machine) are conventionally equipped with an arm (a working part), which is put at both sides of a bonnet and in front of a driver's seat by a rotating rod. A bucket (a working part) is put at the end of the two arms by another rotating rod. These two rotating rods are set in parallel but not on the same axis. Therefore, from the driver's seat it appears that both the arm and the bucket are to rotate up and down around their rotating rods. Both the arm and the bucket are operated by one control lever (a control part). For instance, in the case of a joystick-type control lever, the arm moves up and down by turning the control lever backward and forward, whereas the bucket moves up and down by turning the control lever towards left or right.

3. Problem to be Solved by the Invention

When the bucket is moved up and down by this type of the control lever, the operator has to turn the control lever towards right and left. In other words, the direction to which the operator turns the control lever does not coincide with the direction toward which the bucket moves. Therefore, it takes time for the operator to acquire the operation skill necessary; for that reason, it is difficult for the operator to accurately handle the bucket without a certain amount of work experience. In view of the problem, the primary objective of the present invention is to provide a work machine having a control part which fits the operator's sense of handling.

SUMMARY OF THE INVENTION

Means to Solve the Problem

In order to achieve the above objective, the present invention provides, a work machine having a plurality of working parts, which are coupled with each other in series and have the same rotating direction, and having a control part, which operates the working parts, wherein: the turning direction of the control part is the same as the rotating direction of the working parts, a selection part is equipped in the control part, and one of the working parts can be operated by the control part after one of the working parts is selected by the selection part.

In accordance with another aspect of the present invention, a lock mechanism for the selection part is equipped in the selection part, and one of the working parts can be selected by the selection part only after the lock mechanism for the selection part unlocks.

In accordance with another aspect of the present invention, a lock mechanism is provided for the control part, which prevents the control part from turning, is equipped in the control part.

In accordance with another aspect of the present invention a work machine having has a plurality of working parts, which are coupled with each other in series and have the same rotating direction wherein: a control part for operating one of the working parts is equipped, the turning direction of the control part is the same as the rotating direction of one of the working parts, and another control part for operating another working part is equipped on the control part.

Advantages of the Invention

In accordance with one embodiment of the present invention, a work machine has a plurality of working parts, which are coupled with each other in series and have the same rotating direction, and having a control part, which operates the working parts, wherein: the turning direction of the control part is the same as the rotating direction of the working parts, a selection part is equipped in the control part, and one of the working parts can be operated by the control part after one of the working parts is selected by the selection part. Therefore, more than one working parts can be operated by one control part, which turns to the same direction as the working parts. Hence, a work machine equipped with a control part, which suits the operator's sense of handling, can be provided.

Furthermore, the work machine has a lock mechanism for the selection part is equipped in the selection part, and one of the working parts can be selected by the selection part only after the lock mechanism for the selection part becomes unlocked. Therefore, the work machine can prevent the operator from operating the selection part wrongly.

Moreover, the work machine has a lock mechanism for the control part, which prevents the control part from turning, is equipped in the control part of the work machine. Therefore, the work machine can prevent the operator from operating the control part wrongly.

In accordance with another embodiment of the present invention, a work machine has a plurality of working parts, which are coupled with each other in series and have the same rotating direction wherein: a control part for operating one of the working parts is equipped, the turning direction of the control part is the same as the rotating direction of one of the working parts, and another control part for operating another working part is equipped on the control part. Therefore, the work machine having the control part, which suits the operator's operation feeling, can be provided.

DETAILED DESCRIPTION OF THE INVENTION

Best Mode of Embodying the Invention

Figure 1:
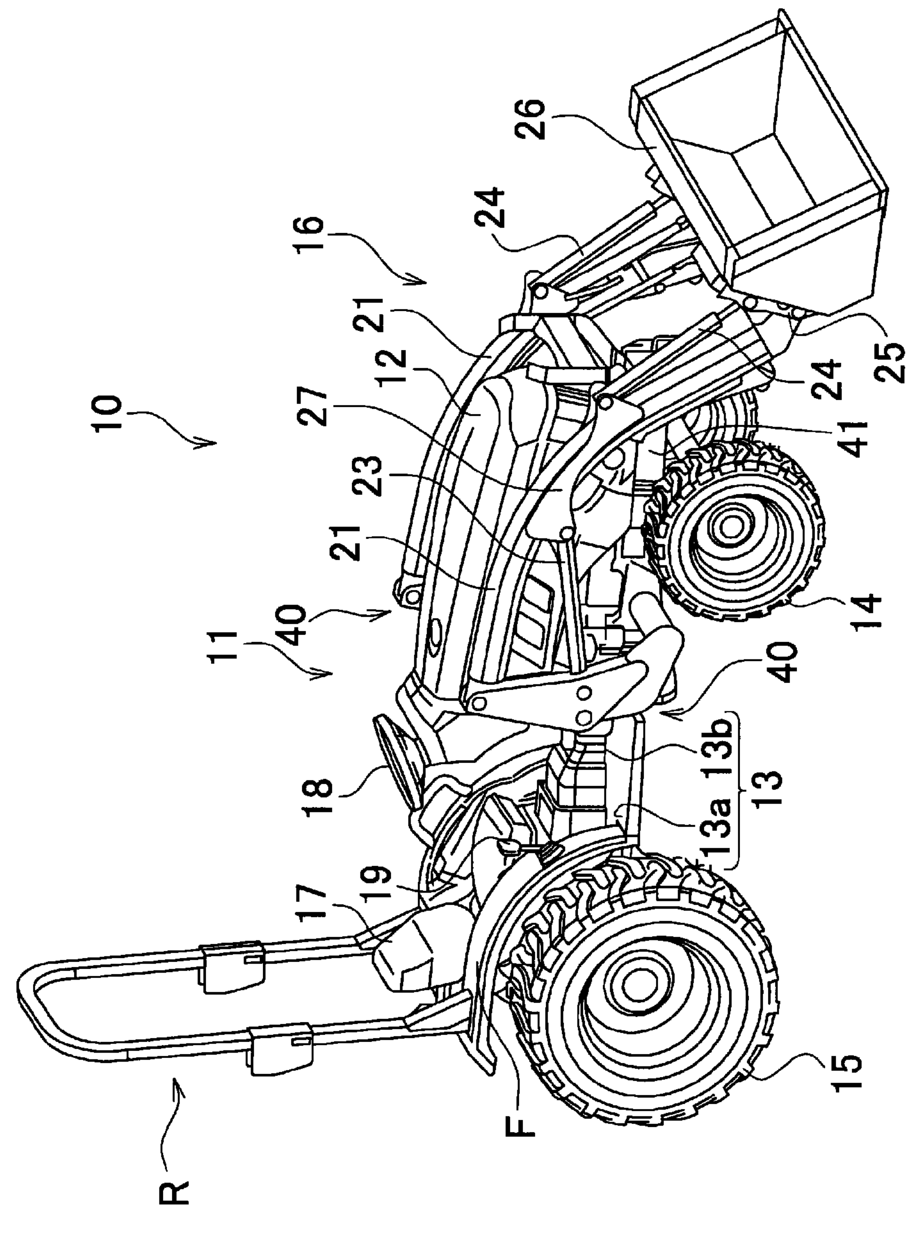
[FIG. 1] A front perspective view of a tractor (a work machine) as a first embodiment of the invention.

The best mode of embodying the invention is described below with reference to specific figures. FIG. 1 shows a front perspective view of the tractor 10 as an example of the present invention, a work machine. The tractor 10 is composed of a main body 11, two front tires 14, two rear tires 15, and a front loader 16. In this specification, it is defined that 'front' is the direction when the tractor 10 is going forward, and 'back' is the direction when the tractor 10 is going backward. Furthermore, 'left' is defined as the left side when the tractor 10 is going forward, and 'right' is defined as the right side when the tractor 10 is going forward.

A car hood 12 is put in the front part of the main body 11. A tank of gas and an engine (these are not shown in the figure) are installed under the car hood 12. A frame 41 is put in the lower part of the main body 11, and the engine is mounted on the frame 41. The driving force of the engine is transmitted to front tires 14 and rear tires 15 through an unshown transmission.

A driver's seat 17, on which a driver sits in order to operate the tractor 10, is at the rear part of the main body 11. The driver can drive the tractor 10 by steering wheel 18 and pedals (unshown), and can operate a front loader 16 by a control lever (a control part) 19. A transmission for changing gears of the tractor 10 is installed underneath the driver's seat 17.

A floor 13 is mounted in front of and down the driver's seat 17. The floor 13 is composed of a pair of plain parts of the floor 13*a*, which are made plain and board-like, and a projection part of the floor 13*b*: the two plain parts of the floor 13*a* comprise the side part of the floor 13*a*, and the projection part of the floor 13*b* is installed in between the two plain parts of the floor 13*a*. The projection part of the floor 13*b* and the two plain parts of the floor 13*a* are coupled with each other. The projection part of the floor 13*b* is bending upward, and a driving shaft, which transmits power from the engine to the transmission, is located under the projection part of the floor 13*b*.

Fenders F are mounted on both sides of the driver's seat 17. The control lever 19 is at the fender F at the right side of the driver's seat 17. A Rollover Protective Structures (ROPS) R, which is an arch-like safety protective frame, is almost vertically installed at the rear part of the fenders F.

A boom holding mechanism 40 for holding the front loader 16 is installed on both sides and in the middle of the tractor 10.

The front loader 16 can be attached to and detached from the tractor 10. The front loader 16 is composed of a pair of booms 21, which are set up at both sides of the tractor 10, two lift cylinders 23, a bucket 26 and two dump cylinders 24. The lift cylinders 23 are to move the boom 21 up and down. The bucket 26 is coupled with the top of the two booms 21. The dump cylinders 24 are to move the bucket 26 up and down.

The booms 21 are shaped as an arc and stretch out toward the front of the tractor 10. Each bottom of the booms 21 is coupled with the upper section of the boom holding mechanism 40, and the two booms 21 are rotatable around the boom holding mechanism 40. The bucket 26, on the other hand, is coupled with each top of the two booms 21 by hitches 25, and is rotatable around the top of the booms 21. The boom 21 is made of a pipe, whose cross section is oval; therefore, the exterior of the boom 21 has more structural strength than a rectangular pipe. A cylinder bracket 27 is welded at the middle section of each boom 21. The cylinder bracket 27 is set upward from the boom 21 in its front part, whereas it is set downward from the boom 21 in as rear part.

The hitch 25 is coupled with the boom 21 detachably. Attachments, such as the bucket 26, can be coupled with the two booms 21 by the two hitches 25.

Each bottom of the two lift cylinders 23 is fixed with the boom holding mechanism 40 and the former is rotatable around the latter. Each top of the two lift cylinders 23, on the other hand, is fixed with the rear part of the two cylinder brackets 27 and the lift cylinders 23 are rotatable around the cylinder brackets 27. The lift cylinders 23 are respectively situated under the booms 21.

Each bottom of the dump cylinders 24 is fixed with the front part of the cylinder bracket 27 and the dump cylinders 24 are rotatable around the cylinder bracket 27. Each top of the dump cylinders 24 is, on the other hand, fixed with the upper part of the hitch 25 and the dump cylinders 24 are rotatable around the hitch 25. The dump cylinders 24 are respectively situated above the booms 21.

The lift cylinders 23 and the dump cylinders 24 are stretchable by the hydraulic operating fluid moving from/to the hydraulic oil tank (unshown).

Therefore, the booms 21 go up (or rotate upward) when the lift cylinders 23 stretch out, whereas the booms 21 go down (or rotate downward) when the lift cylinders 23 shrink. On the other hand, the bucket 26 rotates upward when the dump cylinders 24 shrink, whereas the bucket 26 rotates downward when the dump cylinders 24 stretch out.

Figure 2:
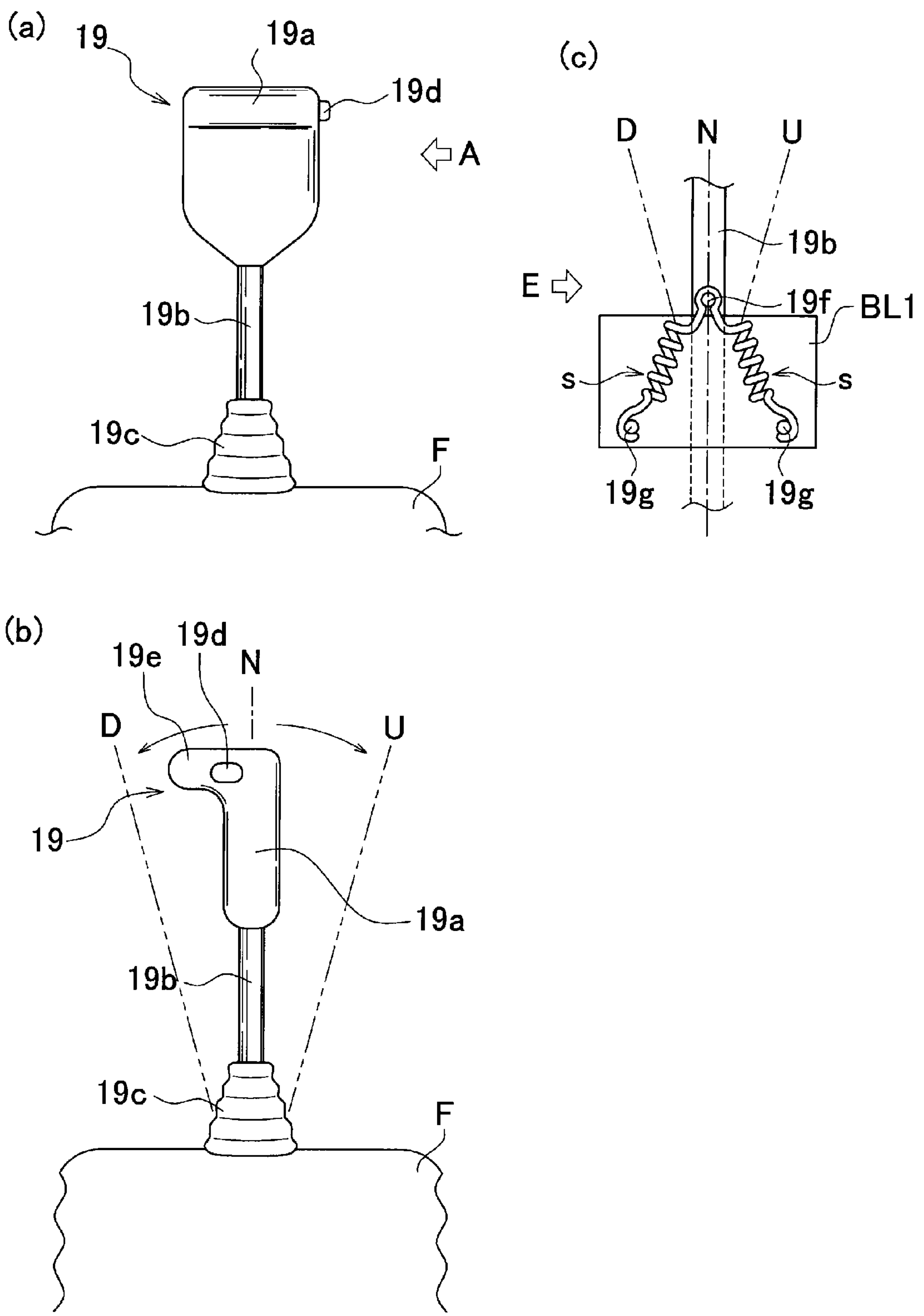
[FIG. 2] (*a*) is a front view of the control lever as an operational part being mounted in the tractor, (*b*) is a side view from the arrow A in (*a*), and (*c*) is the detail of the main part shown in the above figure (*b*).
Figure 3:
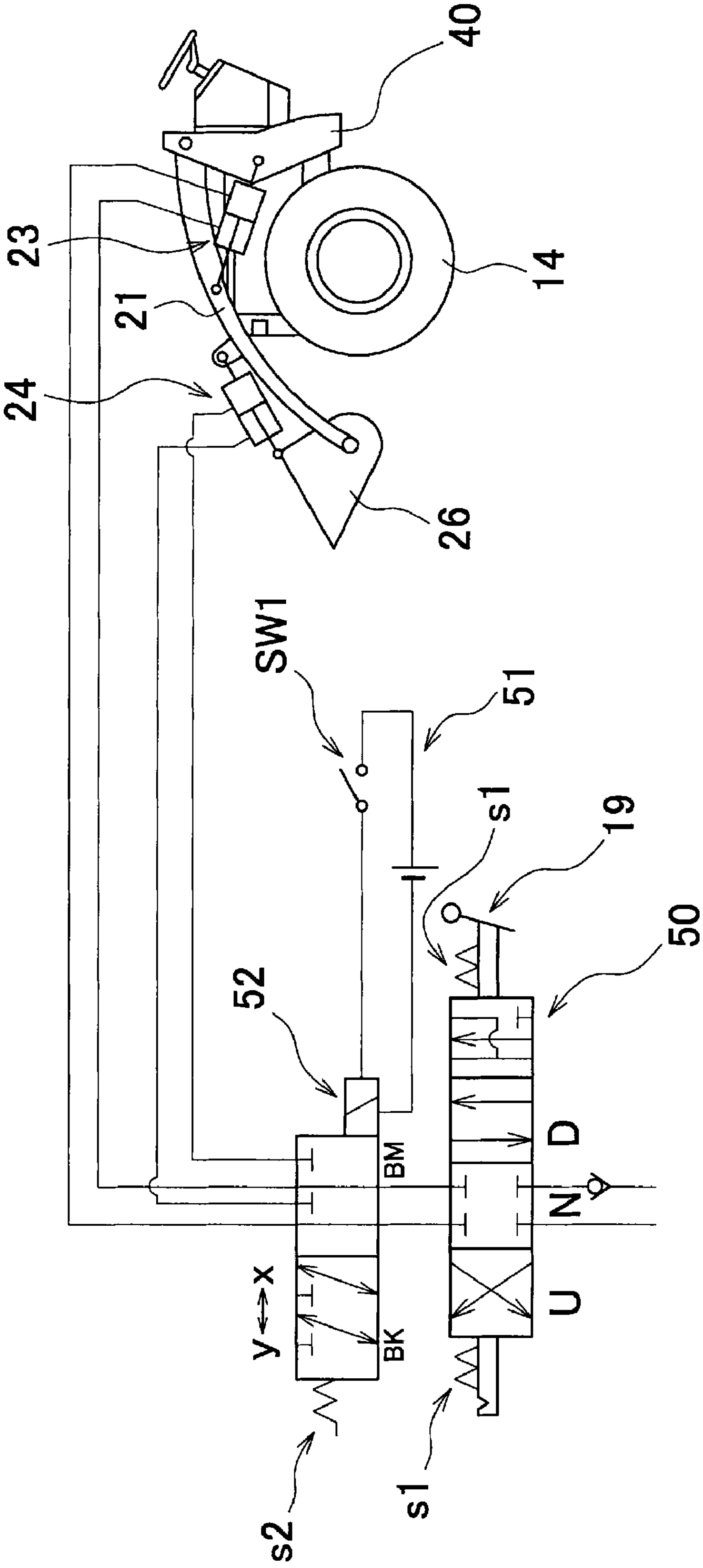
[FIG. 3] A hydraulic circuit for moving the front loader of the tractor shown in FIG. 1.

The control lever 19 is shown in detail in FIGS. 2 (*a*), (*b*) and (*c*), and the hydraulic circuit is shown in FIG. 3. The control lever 19 is to operate the lift cylinders 23 and the dump cylinders 24 of the front loader 16. The control lever 19 is also able to operate a selector valve 50; and the selector valve 50 moves to the position D (down) or the position U (up) when the control lever 19 turns to the D direction or the C direction. A coil spring (an extension spring) s1 is attached to the control lever 19, and the control lever 19 is always set in the position N (neutral) when the control lever 19 is not in operation.

A solenoid valve 52 is connected to an electric circuit 51. The solenoid valve 52 has a spring (an extension spring) s2. FIG. 3 shows the normal position of the solenoid valve 52. When a switch SW1 in the electric circuit 51 is on, the solenoid valve 52 moves toward the direction x. Then, the solenoid valve 52 makes a connection with the dump cylinder 24, which moves the bucket 26, to the hydraulic circuit (the position BK). At this stage, the spring s2 is expanded. When the switch SW1 is off, the solenoid valve 52 is moved toward the direction y by the expanded spring s2, and then, the solenoid valve 52 opens the connection of the lift cylinders 23, which moves the booms 21, to the hydraulic circuit (the position BM).

The hydraulic circuit is connected to the hydraulic oil tank (unshown), and the hydraulic fluid can move with a constant pressure between the hydraulic oil tank and the lift cylinders 23 (or the damp cylinders 24) when the control lever 19 is in operation. While the solenoid valve 52 is in the position BM, if the control lever 19 is turned toward the direction D, then, the lift cylinders 23 shrink. On the other hand, while the solenoid valve 52 is in the position BM, if the control lever 19 is turned toward the U direction, then, the lift cylinders 23 expand. While the solenoid valve 52 is in the position BK, if the control lever 19 is turned toward the direction D, then, the dump cylinders 24 expand. On the other hand, while the control lever 19 is turned toward the U direction, then, the dump cylinders 24 shrink.

The control lever 19 consists of a grip 19*a*, a rod 19*b*, a protection part 19*c* and so on. The grip 19*a* is made of resin and shaped by injection molding. The grip 19*a* has an overhang 19*e* at its top, which projects frontward. The shape of this overhang 19*e* fits in the operator's hand.

The lower part of the rod 19*b* is located inside of the fender F. The lower part of the rod 19*b* is connected with a hydraulic cylinder (unshown).

A bracket BL1 is installed inside of the fender F, and the former is fixed to the latter. Two pins 19*g* are set at the lower part of the bracket BL1. Both ends of two coil springs (extension springs) s are hitched to a pin 19*f* and the two pins 19*g*, 19*g* respectively. The distance between the pin 19*f* and one of the pins 19*g* is equal to the distance between the pin 19*f* and the other pin 19*g*; therefore, the pin 19*f* and the two pins 19*g* respectively become an apex of an isosceles triangle. The two coil springs s are same in terms of length and the spring constant. Therefore, when the rod 19*b* is in the position N, the tension of the two coil springs s is balanced.

As a consequence, when the rod 19*b* is turned toward left (the direction D), the coil spring s on the right side expands, extension force is exerted on the rod 19*b* so that the rod 19*b* can return to the position N. On the other hand, when the rod 19*b* is turned toward right (the direction U), the coil spring s on the left side expands, extension force is exerted on the rod 19*b* so that the rod 19*b* can return to the position N. Therefore, if the operator releases the control lever 19 tilting it toward the direction D (or the direction U), the control lever 19 automatically returns to the position N by the force of the coil spring s.

An operation button (a selection part) 19*d* is mounted on the upper part of the left side of the grip 19*a*, and the operation button 19*d* projects from the grip 19*a*. The operation button 19*d* which is made of resin, stands as a column with a dome-like tip. The back of the operation button 19*d* is flat. The actuator of the switch SW1 (the switch SW1 is a push-plunger type limit switch with the actuator) is touching the back of the operation button 19*d*.

The grip 19*a* has a cavity in which the operation button 19*d*, the switch SW1, electric cords, the rod 19*b*, and so on are stored. The electric cords, which are connected to the switch SW1 (and the elements of the electric circuit 51), run through the inside of the rod 19*b* and connect to batteries, the solenoid valve 52 and so on.

The switch SW1 is located inside the grip 19*a* so that the actuator of the switch SW1 can touch the bottom of the operation button 19*d*. The switch SW1 is a make contact switch. Therefore, when the operator presses the operation button 19*d*, the switch SW1 of the electric circuit 51 is on whereas when the operator releases the operation button 19*d*, the switch SW1 of the electric circuit 51 is off.

The rod 19*b* is made of a metal pipe, and its upper part is embedded in the grip 19*a*. The selector valve 50, which is a conventional selector valve, in the hydraulic circuit of FIG. 3 is connected to the bottom of the rod 19*b*. The protection part 19*c* covers the gap between the rod 19*b* and the fender F in order to prevent dust from coming inside the fender F. The protection part 19*c* is made of a flexible material to allow it to follow the movement of the rod 19*b*.

The control lever 19 can move between three positions (D: down, N: neutral and U: up). Whenever the control lever 19 is not in operation, it is in the position N. When the control lever 19 is in the position N, the selector valve 50 is in the position which is to close the hydraulic circuit (the position in between U and D in FIG. 3).

The procedure for operating the front loader 16 by use of the control lever 19 is shown as follows: In order to move the booms 21 upward, turn the control lever 19 toward the operator's side (the U direction). The selector valve 50 moves toward the direction U, thus, the hydraulic circuit of the lift cylinders 23 is opened, causing the lift cylinders 23 to expand. In order to stop moving the booms 21 upward, release the control lever 19. The control lever 19 returns to the position N by the force of the coil spring s, and the selector valve 50 moves toward the position N for closing the hydraulic circuit of the lift cylinders 23.

In order to move the booms 21 downward, turn the control lever 19 frontward (the direction D). The selector valve 50 moves toward the direction D, thus, the hydraulic circuit of the lift cylinders 23 is opened, causing the lift cylinders 23 to shrink. In order to stop moving the booms 21 downward, release the control lever 19. The control lever 19 returns to the position N by the force of the coil spring s, and the selector valve 50 moves toward the position N for closing the hydraulic circuit of the lift cylinders 23.

In order to move the bucket 26 upward (in order to rotate it to the operator's side), press the operation button 19*d*. The switch SW1 of the electric circuit 51 turns on and the solenoid valve 52 moves toward the direction x. Thus, the solenoid valve 52 is switched from the hydraulic circuit with the lift cylinders 23 to the one with the dump cylinders 24. Turn the control lever 19 toward the operator's side (the direction U), then the selector valve 50 moves toward the position U. The hydraulic circuit of the dump cylinders 24 is opened, and then, the dump cylinders 24 shrink.

In order to stop moving the bucket 26 upward, release the control lever 19. The control lever 19 returns to the position N by the force of the coil spring s, and the selector valve 50 moves toward the position N for closing the hydraulic circuit of the lift cylinders 23. In addition, the switch SW1 of the hydraulic circuit 51 turns off because the operation button 19*d* is released. Then, the solenoid valve 52 moves toward the direction y and is switched from the hydraulic circuit with the dump cylinders 24 (the position BK) to the one with the lift cylinders 23 (the position BM).

In order to move the bucket 26 downward (in order to rotate it frontward), press the operation button 19*d*. The switch SW1 of the electric circuit 51 turns on and the solenoid valve 52 moves toward the direction x. Thus, the solenoid valve 52 is switched from the hydraulic circuit with the lift cylinders 23 (the position BM) to the one with the dump cylinders 24 (the position BK). Turn the control lever 19 forward (the direction D), then the selector valve 50 moves toward the position D. The hydraulic circuit of the dump cylinders 24 is opened, and then, the dump cylinders 24 expand.

In order to stop moving the bucket 26 downward, release the control lever 19. The control lever 19 returns to the position N by the force of the coil spring s, and the selector valve 50 moves toward the position N for closing the hydraulic circuit of the lift cylinders 23. In addition, the switch SW1 of the hydraulic circuit 51 turns off because the operation button 19*d* is released. Then, the solenoid valve 52 moves toward the direction y and is switched to the one with the lift cylinders 23 (the position BM).

The operation button 19*d* of this invention may be set in the following way: the operation button is to be pressed only when the control lever 19 is in the position N. A detent mechanism may be introduced to construct this mechanism.

Further Embodiment 1

Figure 4:
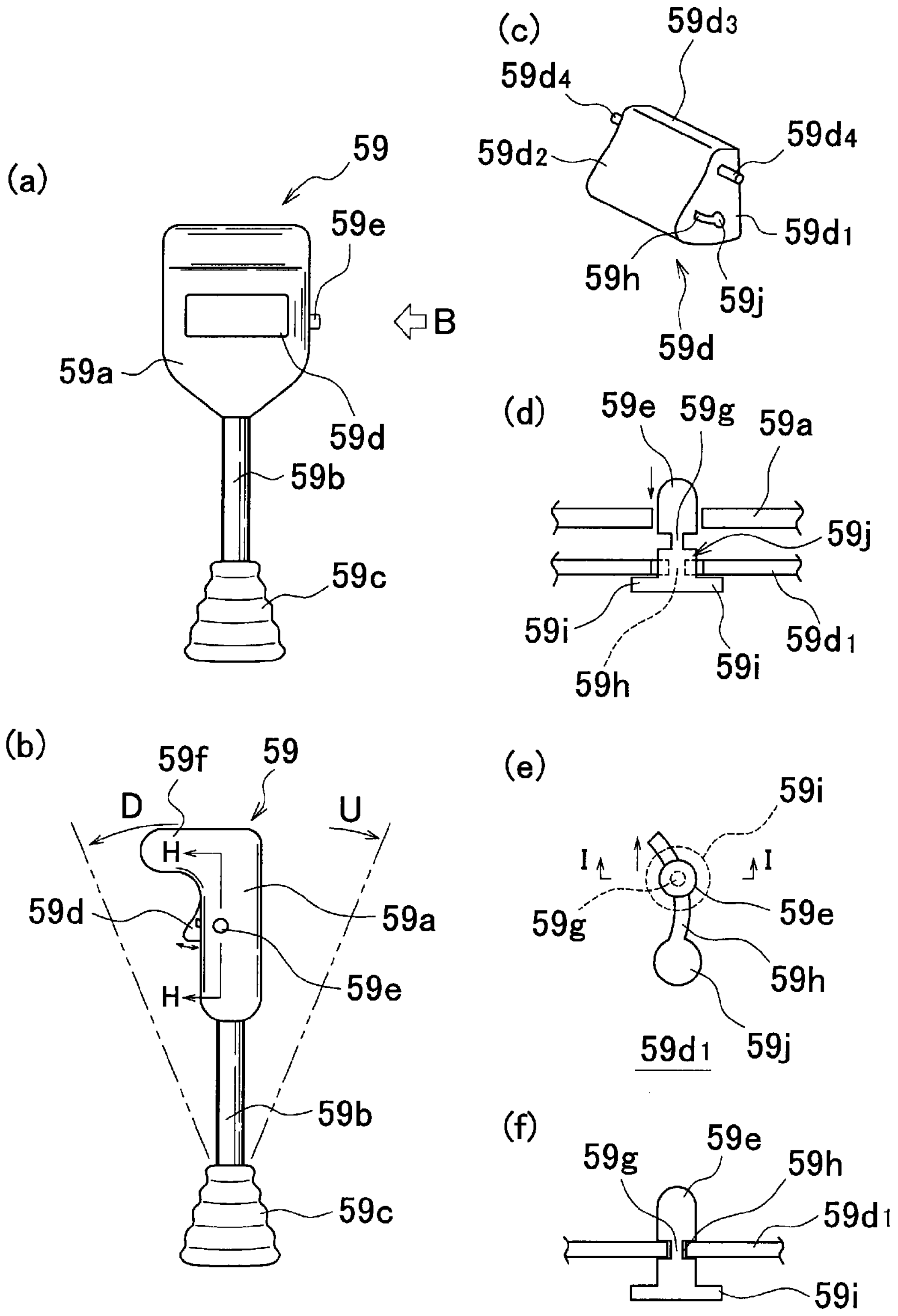
[FIG. 4] (*a*) is a front view of another embodiment of the operational part of the invention, (*b*) is a side view from the arrow B in (*a*), (*c*) is a front perspective view of the operational button, (*d*) is a sectional view of the arrow H in (*b*), (*e*) is a right side view of the operational button (on the condition that the operational button is on while the safety lock is unlocked), and (*f*) is a simplified sectional view from the arrow I in (*e*).

The further embodiment of this invention is shown in FIG. 4 (*a*) to FIG. 4 (*f*). A control lever 59 consists of a grip 59*a*, a rod 59*b*, a protection part 59*c* and so on. The control lever 59 can move between three positions (D: down, N: neutral and U: up).

The grip 59*a* is made of resin and shaped by injection molding. The grip 59*a* has an overhang 59*f* at its top, which projects frontward. A trigger-type operation button (a selection part) 59*d* is located at the front of the grip 59*a*. The rod 59*b* is made of a metal pipe, and its upper part is embedded in the grip 59*a*. The selector valve 50 in the hydraulic circuit of FIG. 3 is connected with the bottom of the rod 59*b*. A protection part 59*c* covers the gap between the rod 59*b* and the fender F in order to prevent dust from coming inside the fender F. The description of the lower part of the rod 59*d* is omitted as the lower part of the rod 59*d* has been described in the previous embodiment.

An operation button 59*d* consists of a pair of side parts 59*d*1 (made of a trapezoidal board), a front part 59*d*2, a top part 59*d*3, a bottom part 59*d*5 and so on. Rotating rods 59*d*4 are respectively located at the upper section of the two side parts 59*d*1. A round hole 59*j* is connected to an oblong hole 59*h* and both are located in the right side part 59*d*1. The operation button 59*d* is made of resin and is shaped by injection molding. The operation button 59*d* is forced by an unshown spring to project from the grip 59*a*. The switch SW1 in the electric circuit 51 is on when the operation button 59*d* is pressed. On the other hand, the switch SW1 in the electric circuit 51 is off when the operation button 59*d* is released.

A safety lock button (a lock mechanism for the selection part) 59*e* is mounted on the middle of the left side of the grip 59*a*. The safety lock button 59*e* is made of resin and is shaped by injection molding. The safety lock button 59*e* consists of a column-type main body and a disk 59*i* whose radius is bigger than that of the main body. A narrow part 59*g*, a groove, is made around the middle section of the side of the main body.

The safety lock button 59*e* is constantly forced toward the outside of the grip 59*a* by an unshown spring.

The diameter of a round hole 59*j* is bigger than that of the main body of the safety lock button 59*e* and smaller than that of the disk 59*i*; therefore, the safety lock button 59*e* cannot come out from the round hole 59*j*. Hence, the disk 59*i* works as a stopper for the spring force pressing the safety button 59*e* toward the outside. This lock mechanism comprises a detent.

The width of the oblong hole 59*h* is a bit bigger than that of the narrow part 59*g* of the safety lock button 59*e*.

The operation button 59*d* is mounted on the grip 59*a* so that the safety lock button 59*e* can get through the round hole 59*j* of the operation button 59*d*. The operation button 59*d* is rotatable around the grip 59*a* by the rotating rods 59*d*4. In normal state the safety lock button 59*e* upheaves in the round hole 59*j*; therefore, the operation button 59*d* cannot be pressed.

The hydraulic circuit of this embodiment is the same as the previous one with the exception of the following points: The control lever 59 operates the switching direction valve 50 instead of the control lever 19, and the operation button 59*d* operates the switch SW1 instead of the operation button 19*d*.

The procedure for operating the front loader 16 by use of the control lever 59 is shown as follows. In order to move the booms 21 up, turn the control lever 59 toward the operator's side (the U direction in FIG. 4 (*b*)). The selector valve 50 moves toward the position U, thus, the hydraulic circuit of the lift cylinders 23 is opened, and the lift cylinders 23 expand. In order to stop moving the booms 21 up, release the control lever 59. The control lever 59 returns to the position N by the force of the coil spring s, and the hydraulic circuit of the lift cylinders 23 is closed.

In order to move the booms 21 downward, turn the control lever 59 frontward (the direction D in FIG. 4 (*b*)). The selector valve 50 moves toward the position D, thus, the hydraulic circuit of the lift cylinders 23 is opened, and the lift cylinders 23 shrink. In order to stop moving the booms 21 downward, release the control lever 59. The control lever 59 returns to the position N by the force of the coil spring s, and the hydraulic circuit of the lift cylinders 23 closes.

In order to move the bucket 26 upward (in order to rotate it to the operator's side), press and hold the safety lock button 59*e*, and press the operation button 59*d*. The operation button 59*d* unlocks by pressing the safety lock button 59*e*, and the oblong hole 59*h* of the operation button 59*d* can move along the narrow part 59*g* of the safety lock button 59*e*. (FIG. 4 (*e*), (*f*)

The end of the operation button 59*d* pushes the limit switch SW1 when the operation button 59*d* is pressed. Then, the switch SW1 of the electric circuit 51 is on, and the solenoid valve 52 moves toward the direction x. Thus, the solenoid valve 52 opens the hydraulic circuit with the dump cylinders 24 and closes the one with the lift cylinders 23. Turn the control lever 59 toward the operator's side (the direction U in FIG. 4 (*b*)) by continuously pressing the operation button 59*d*.

Then the selector valve 50 moves toward the position U. The hydraulic circuit of the dump cylinders 24 is opened, and the dump cylinders 24 shrink. In order to stop moving the bucket 26 up, return the control lever 19 to the position N. By releasing the operation button 59*d*, it returns to the normal position projecting toward the driver's seat by the force of the coil spring. Then, the switch SW1 of the electric circuit 51 becomes off, and the solenoid valve 52 moves toward the direction y and is switched to the hydraulic circuit with the lift cylinders 23. When the operation button 59*d* returns to the normal position, the safety lock button 59*e* upheaves in the round hole 59*j* and is locked by the round hole 59*j*.

In order to move the bucket 26 downward (in order to rotate it forward), as described above, press and hold the safety lock button 59*e*, and press the operation button 59*d*. The switch SW1 of the electric circuit 51 is on, and the solenoid valve 52 moves toward the direction x. Thus, the solenoid valve 52 is switched from the hydraulic circuit with the lift cylinders 23 to the one with the dump cylinders 24. Turn the control lever 59 forward (the direction D of FIG. 4 (*b*)) by continuously pressing the operation button 59*d*.

The selector valve 50 moves toward the position D. Consequently, the hydraulic circuit of the dump cylinders 24 is opened, and the dump cylinders 24 expand. In order to stop moving the bucket 26 downward, return the control lever 59 to the position N. By releasing the operation button 59*d*, the switch SW1 of the electric circuit 51 becomes off, and the solenoid valve 52 moves toward the direction y and is switched to the hydraulic circuit with the lift cylinder 23. When the operation button 59*d* returns to the normal position, the safety lock button 59*e* upheaves in the round hole 59*j* and is locked by the round hole 59*j*.

Further Embodiment 2

Figure 5:
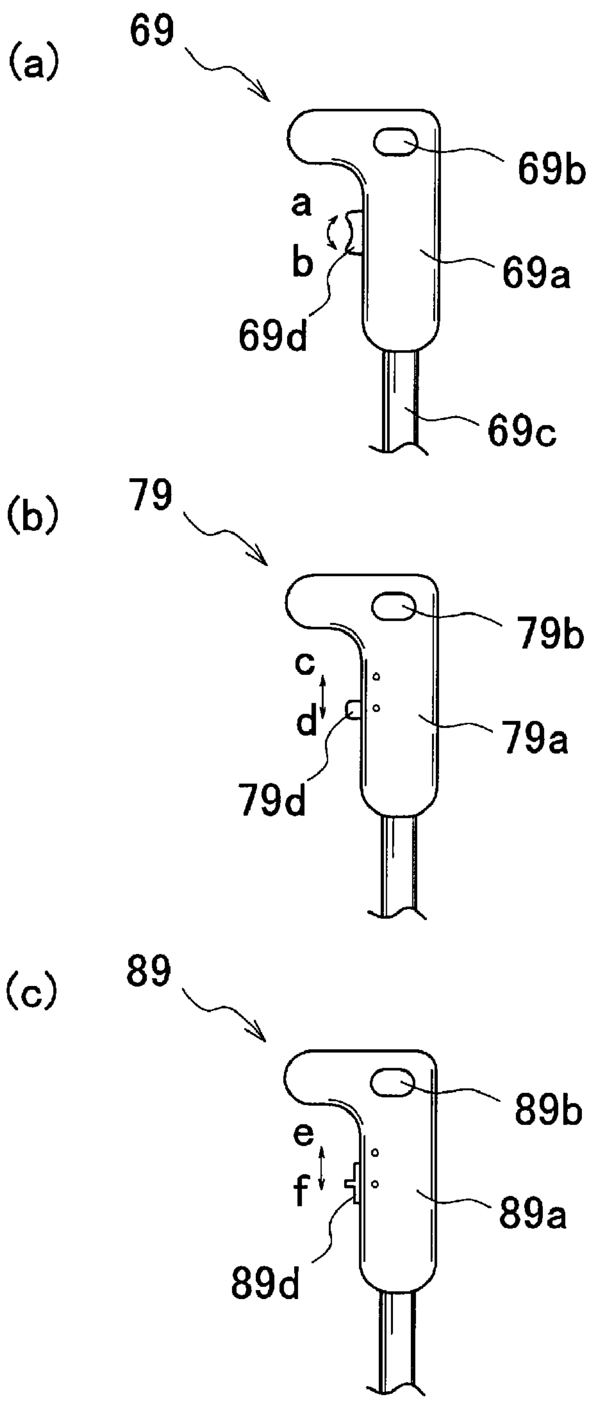
[FIG. 5] (*a*), (*b*), and (*c*) are respectively simplified side views of the main part of the further embodiment of the operational part of the invention.

FIGS. 5 (*a*), (*b*) and (*c*) show other embodiments of the invention. FIG. 5 (*a*) shows a locker switch (a selection part) 69*d* being installed on a control lever (a control part) 69. The locker switch 69*d* is set on the left side of the middle part of the back of a grip 69*a*. The locker switch 69*d* is able to select the operation of the booms 21 and the bucket 26 (when pressed toward the direction 'a', the booms 21 can be selected, whereas when pressed toward the direction 'b', the bucket 26 is in operation).

Furthermore, a lock release button (a lock mechanism for the control part) 69*b* is equipped in this embodiment. The lock release button 69*b* unlocks the control lever 69. The control lever 69 can be turned toward the position D (down) or the position U (up) only when the lock release button 69*b* is pressed.

Other structures in the control lever 69 and the structure of the hydraulic circuit are the same as in the previous embodiment; therefore, their description is omitted.

The procedure for operating the front loader 16 by use of the control lever 69 is as follows: In order to move the booms 21 up, press the locker switch 69 toward the direction a. Then, turn the control lever 69 toward the operator's side (the direction is explained in the previous embodiment) by pressing the lock release button 69*a*. The selector valve 50 moves toward the direction U (c.f. FIG. 3), thus, the lift cylinders 23 expand. In order to stop moving the booms 21 upward, release the control lever 69. The control lever 69 returns to the position N by the force of the coil spring s.

In order to move the booms 21 downward, confirm the locker switch 69 is in the position a (if the locker switch 69 is not in position a, press it toward the direction a). Then, turn the control lever 69 forward (the direction is the same as in the previous embodiment) by pressing the lock release button 69*a*. The selector valve 50 moves toward the direction D, thus, the lift cylinders 23 shrink. In order to stop moving the booms 21 downward, release the control lever 69. The control lever 69 returns to the position N by the force of the coil spring s.

In order to move the bucket 26 upward (in order to rotate it to the operator's side), press the locker switch 69*d* toward the direction b. Then, the switch SW1 in the electric circuit 51 is on, and the solenoid valve 52 moves toward the direction T. Thus, the solenoid valve 52 closes the hydraulic circuit with the lift cylinders 23 and opens the one with the dump cylinders 24. Then, turn the control lever 69 toward the operator's side by pressing the lock release button 69*b*.

The selector valve 50 moves toward the position U. The hydraulic circuit of the dump cylinders 24 is opened, and then, the dump cylinders 24 shrink. In order to stop moving the bucket 26 upward, return the control lever 69 to the position N.

In order to move the bucket 26 downward (in order to rotate it forward), confirm the locker switch 69*d* is in the position b (if the locker switch 69*d* is not in the position b, press it toward the direction b). The switch SW1 in the electric circuit 51 is on and the solenoid valve 52 moves toward the direction x. Thus, the solenoid valve 52 closes the hydraulic circuit with the lift cylinders 23 and opens the one with the dump cylinders 24. Then, turn the control lever 69 forward by pressing the lock release button 69*b*.

The selector valve 50 moves toward the direction D, and the hydraulic circuit with the dump cylinders 24 is opened. Then, the dump cylinders 24 expand. In order to stop moving the bucket 26 down, return the control lever 69 to the position N.

Further Embodiment 3

Another embodiment of this invention is shown in FIG. 5 (*b*). A control lever 79 in this embodiment equips a slide switch (a selection part) 79*d* instead of the locker switch 69*d* of the control lever 69 in FIG. 5 (*a*). The other structures in the control lever 79 and the hydraulic circuit are the same as in the previous embodiment shown in FIG. 5 (*a*), therefore, their description is omitted (A mark '79*a*' shows a grip and a mark '79*d*' shows a lock release button).

The procedure for operating the front loader 16 by use of the control lever 79 is shown as follows: When moving the slide switch 79*d* toward the direction the same condition occurs in the hydraulic circuit as when the locker switch 69*d* described above is pressed toward the direction a. Furthermore, when moving the slide switch 79*d* toward the direction 'd', the same condition occurs in the hydraulic circuit as when the locker switch 69*d* described above is pressed toward the direction b. Other movements are the same as in the previous embodiment.

Further Embodiment 4

Further embodiment of this invention is shown in FIG. 5 (*c*). A slide switch 89*d* equipped in the control lever 89 is a variation model of the slide switch 79*d* in FIG. 5 (*b*). The other structures of the control lever 89 are the same as in the previous embodiment shown in FIG. 5 (*a*), therefore, their description is omitted (A mark '89*a*' shows a grip and a mark '89*d*' shows a lock release button).

The procedure for operating the front loader 16 by use of the control lever 89 is shown as follows: When moving the slide switch 89*d* toward the direction 'e', the same condition occurs in the hydraulic circuit as when the locker switch 69*d* described above is pressed toward the direction a. Furthermore, when moving the slide switch 89*d* toward the direction 'f', the same condition occurs in the hydraulic circuit as when the locker switch 69*d* described above is pressed toward the direction b. The other movements are the same as in the previous embodiment.

Further Embodiment 5

Figure 6:
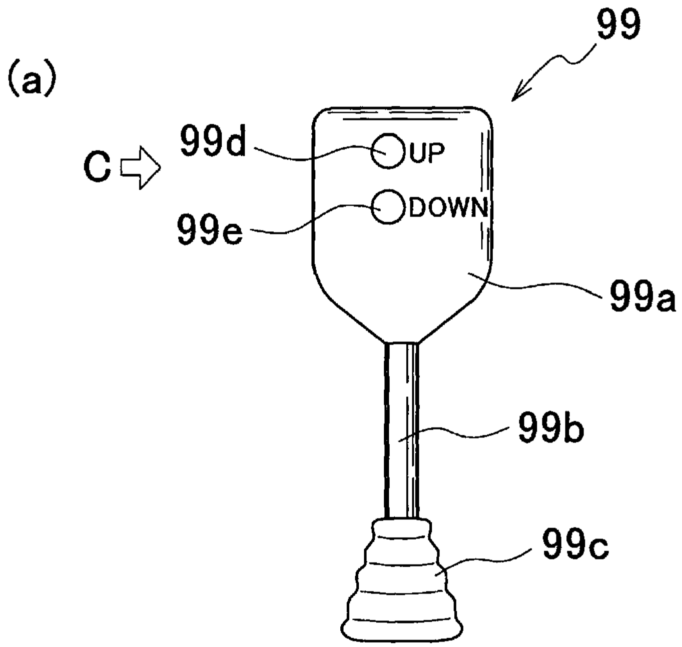
[FIG. 6] (*a*) is a front view of the operational part of the further embodiment of the invention, and (*b*) is a side view from the arrow C.
Figure 6:
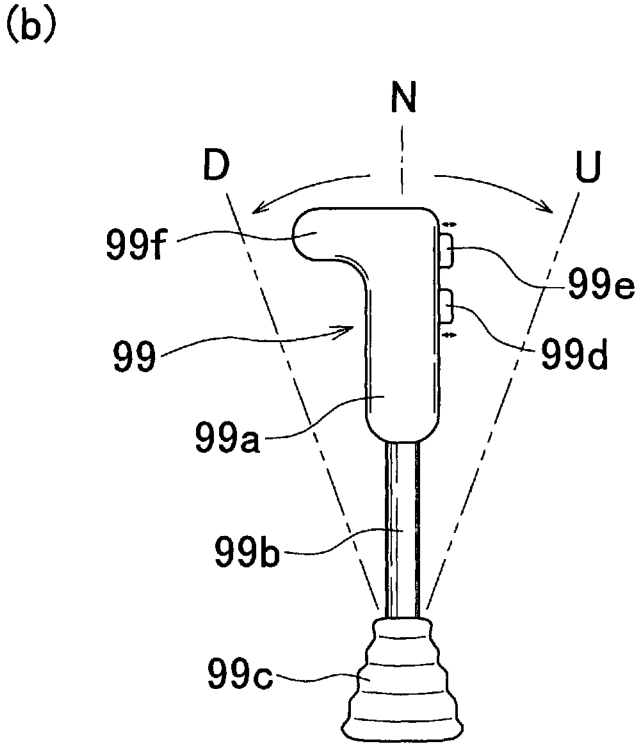

Further embodiment of a control part of this invention is shown in FIG. 6 (*a*) and (*b*). A control lever 99 operates the front loader 16, and consists of a grip 99*a*, a rod 99*b*, a protection part 99*c* and so on. The grip 99*a* is made of resin and shaped by injection molding. The grip 99*a* has an overhang 99*f* at its top, which projects frontward. The shape of this overhang 99*f* fits in the operator's hand.

Control buttons (another control part) 99*d*, 99*e* are mounted on the upper part of the back of the grip 99*a*. The control button 99*d* moves the bucket 26 upward whereas the control button 99*e* moves the bucket 26 downward. The control buttons 99*d*, 99*e* are constantly forced toward the outside of the grip 99*a* by unshown springs. The operation button 99*d* which moves bucket 26 upward is mounted above the operation button 99*e* for moving the bucket 26 downward. Therefore, the location of the two control buttons 99*d*, 99*e* coincides with the moving direction of the bucket 26. The operator can easily operate the bucket 26 using the control lever 99.

When pressing the control button 99*d* or the control button 99*e*, the switch of an electric circuit as described below (this switch is a push-plunger-type limit switch as described above) is on. On the other hand, when releasing the control button 99*d* or the control button 99*e*, the switch of an electric circuit is off. The rod 99*b* is made of a metal pipe, and its upper part is embedded in the grip 99*a*. The selector valve in the hydraulic circuit is connected with the bottom of the rod 99*b* (the selector valve of the hydraulic circuit is a conventional one). A protection part 99*c* covers the gap between the rod 99*b* and the fender F in order to prevent dust from coming inside the fender F.

The control lever 99 in this embodiment can move back and forth between three positions (D: down, N: neutral and U: up). The booms 21 are operated by turning the control lever 99 frontward or backward, whereas the bucket 26 is operated by pressing the control button 99*d* or the control button 99*e*.

Figure 7:
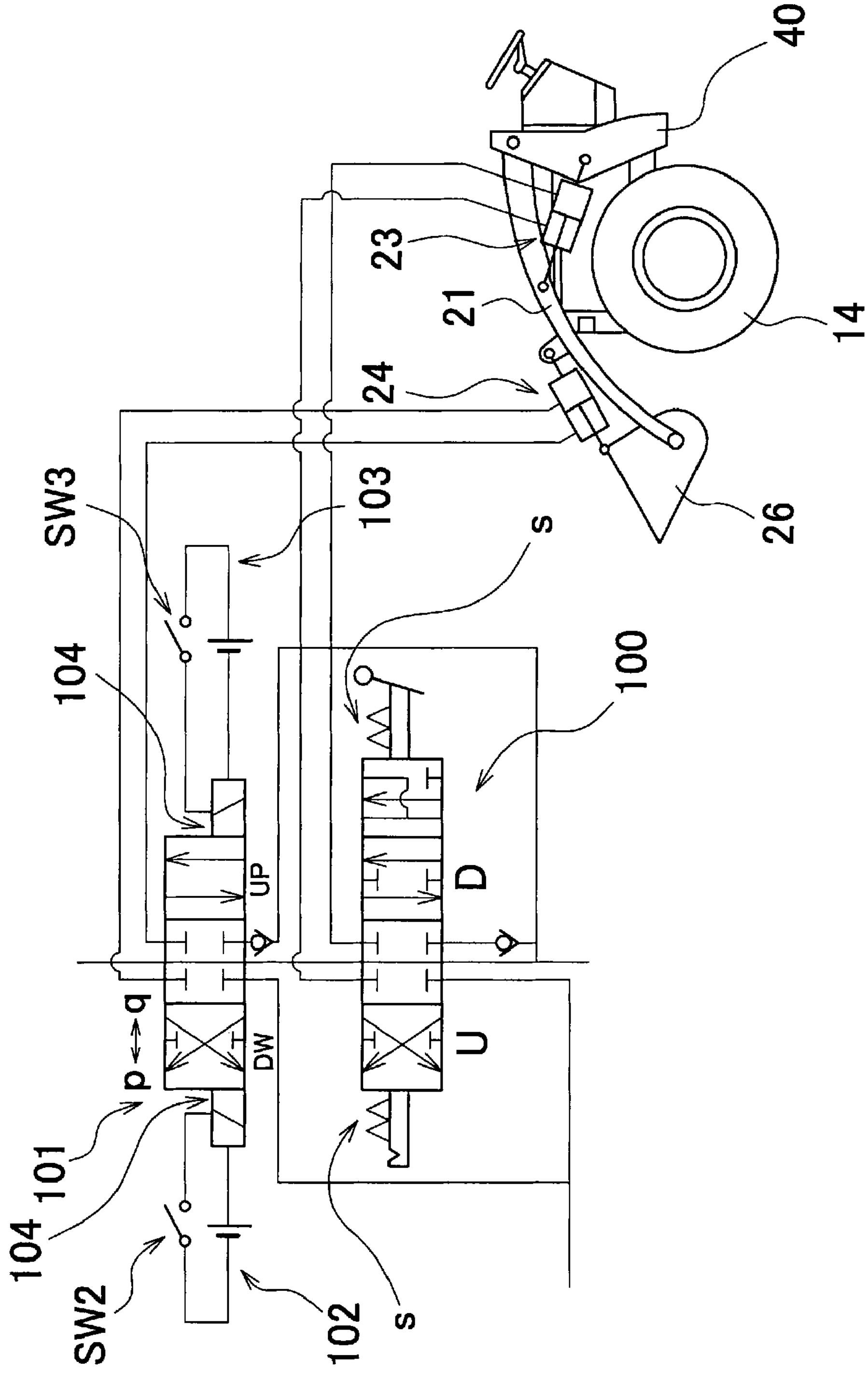
[FIG. 7] A hydraulic circuit for the control lever in FIG. 6.

The procedure for operating the front loader 16 by use of the control lever 99 is described as follows in FIGS. 6 and 7 (FIG. 1 should also be used). In order to move the booms 21 upward, turn the control lever 99 toward the operator's side (the direction U in FIG. 6 (*b*)). Then, the selector valve 100 moves to the position U, and, the lift cylinders 23 expand. In order to stop moving the booms 21 upward, release the control lever 99. The control lever 99 returns to the position N by the force of the coil spring s.

In order to move the booms 21 downward turn the control lever 99 frontward (the D direction in FIG. 6 (*b*)). Then, the selector valve 100 moves to the position D, and the lift cylinders 23 shrink. In order to stop moving the booms 21 downward, release the control lever 99. The control lever 99 returns to the position N by the force of the coil spring s.

In order to move the bucket 26 upward (in order to rotate it to the operator's side), press the operation switch 99*d*. The switch SW2 in the electric circuit 102 is on, and the solenoid valve 104 moves toward the 'p' direction and is in the position UP. Thus, the solenoid valve 104 opens the hydraulic circuit with the dump cylinders 24 and the dump cylinders 24 shrink. In order to stop moving the bucket 26 upward, release the control lever 99. The switch SW2 in the electric circuit 102 is off, and the solenoid valve 104 moves toward the 'q' direction. Thus, the solenoid valve 104 closes the hydraulic circuit with the dump cylinders 24.

In order to move the bucket 26 downward (in order to rotate it forward), press the control button 99*e*. The switch SW3 in the electric circuit 103 is on, the solenoid valve 104 moves toward the direction and is in the position DW. Thus, the solenoid valve 104 opens the hydraulic circuit with the dump cylinders 24 and the dump cylinders 24 expand. In order to stop moving the bucket 26 downward, release the control button 99*e*. The switch SW3 in the electric circuit 103 is off, and the solenoid valve 104 moves toward the 'p' direction. Thus, the solenoid valve 104 closes the hydraulic circuit with the dump cylinders 24.

The booms 21 and the bucket 26 may be operated at the same time. In other words, while the control lever 99 moves the booms 21 up or down, the control buttons 99*d*, 99*e* move the bucket 26 up or down.

As described above, this invention is applied to a tractor, an agricultural work machine, as an example of a work machine; however, the invention is not limited to the agricultural work machines. It can also be applied to a construction work machine, such as a bulldozer or a back hoe. Furthermore, it can also be applied to a work machine without wheels, such as a work machine which has arms and a bucket but is installed in a factory. Also, the work part can be composed of more than three items, such as arms and a bucket.

What is claimed is:

1. A work machine comprising:

two working parts coupled with each other in series and having the same rotating direction;

a control part configured to operate the two working parts, a turning direction of the control part being the same as the rotating direction of the two working parts; and a button equipped in the control part, wherein one of the two working parts can become operated by the control part after pressing the button whereas the other one of the two working parts can become operated by the control part without pressing the button.

2. The work machine according to claim 1, wherein: a lock mechanism for the button is equipped, and one of the two working parts can be selected by the button only after the lock mechanism for the button unlocks.

3. The work machine according to claim 1, wherein a lock mechanism for the control part is equipped in the control part, and configured to prevent the control part from turning.

4. A work machine comprising:

two working parts coupled with each other in series and having the same rotating direction;

a control part configured to operate one of the two working parts, a turning direction of the control part being the same as the rotating direction of one of the two working parts; and another control part configured to operate the other one of the two working part and equipped on the control part.

5. A work machine comprising:

two working parts coupled with each other in series and having the same rotating direction;

a control part configured to operate the two working parts, a turning direction of the control part being the same as the rotating direction of the two working parts; and a switch equipped in the control part, wherein one of the two working parts can become operated by the control part after operating the switch towards one direction whereas the other one of the two working parts can become operated by the control part after operating the switch towards the other direction.

* * * * *